United States Patent  (10) Patent No.: US 9,232,154 B2
Ragozin et al.  (45) Date of Patent: Jan. 5, 2016

(54) OBJECT SELECTION IN AN IMAGE (75) Inventors: Dmitry Vasilievich Ragozin, Nizhny Novgorod (RU); Iliya Mikhailovich Mironov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 13/997,685

(22) PCT Filed: Jan. 25, 2012

(86) PCT No.: PCT/RU2012/000032
§ 371 (c)(1),
(2), (4) Date: Oct. 10, 2013

(87) PCT Pub. No.: WO2013/112065
PCT Pub. Date: Aug. 1, 2013

(65) Prior Publication Data
US 2014/0036110 A1    Feb. 6, 2014

(51) Int. Cl.
*H04N 5/262* (2006.01)
*H04N 5/272* (2006.01)
*G06K 9/32* (2006.01)
*G06K 9/00* (2006.01)
*G06T 1/00* (2006.01)

(52) U.S. Cl.
CPC .......... *H04N 5/2621* (2013.01); *G06K 9/00281* (2013.01); *G06K 9/3241* (2013.01); *G06T 1/00* (2013.01); *H04N 5/272* (2013.01)

(58) Field of Classification Search
None
See application file for complete search history.

(56) References Cited

U.S. PATENT DOCUMENTS

| 7,936,357 B2* | 5/2011 | Yamada | 345/581 |
| 8,213,737 B2* | 7/2012 | Steinberg et al. | 382/275 |
| 8,306,265 B2* | 11/2012 | Fry et al. | 382/103 |
| 2003/0086619 A1 | 5/2003 | Nagaishi | |
| 2006/0187476 A1* | 8/2006 | Yamada | 358/1.9 |
| 2007/0110335 A1 | 5/2007 | Taylor et al. | |
| 2008/0317379 A1 | 12/2008 | Steinberg et al. | |
| 2010/0177968 A1* | 7/2010 | Fry et al. | 382/224 |

FOREIGN PATENT DOCUMENTS

RU    2400815 C2    9/2010
WO    2013112065 A1    8/2013

OTHER PUBLICATIONS

International Search Report and Written Opinion received for International Application No. PCT/RU2012/000032, mailed Oct. 4, 2012, 7 pages.

(Continued)

*Primary Examiner* — Ahmed A Berhan
(74) *Attorney, Agent, or Firm* — Barnes & Thornburg LLP (57) ABSTRACT

Illustrative embodiments of methods, machine-readable media, and computing devices allowing object selection in an image are disclosed. In some embodiments, a method may include detecting one or more features of an object in a machine-readable image file, simulating an electrostatic charge distribution by assigning a virtual point charge to each of the one or more detected features, determining a virtual electric potential field resulting from the simulated electrostatic charge distribution, and selecting a portion of the object in the machine-readable image file that is bounded by an equipotential line in the virtual electric potential field.

24 Claims, 6 Drawing Sheets

(56) References Cited

OTHER PUBLICATIONS

Durand, F., "Graph Cut," 6.088/6.882 Digital & Computational Photography, Massachusetts Institute of Technology, Mar. 13, 2007, available: <http://stellar.mit.edu/S/course/6/sp07/6.088/courseMaterial/topics/topic1/ lectureNotes/09_graphcut.ppt6/09_graphcut.ppt6.pdf>, 9 pages.

Frischholz, R., "Face Detection—The Face Detection Homepage," Apr. 4, 2011, <http://facedetection.com/>, 1 page.

\* cited by examiner

OBJECT SELECTION IN AN IMAGE

BACKGROUND

The recognition and selection of objects in images present challenging problems in the computational photography area. Systems and methods configured to select an object in an image based on the object's features of interest may significantly improve the effectiveness of image-editing software, as well as its user experience. For instance, selecting an image area containing an object's features of interest—while avoiding selecting an unnecessarily large image area containing unwanted image artifacts—may allow the object to be copied and pasted into another image in a seamless manner. In particular, systems and methods configured to select an object in an image based on the object's features of interest may allow the user of a mobile computing device to perform on-the-fly editing of images captured by a camera of the mobile computing device.

Current image-editing systems typically use a "graph-cut" method to select an object in an image. Graph-cut methods generally attempt to separate an object of interest in an image from the background of the image by determining the similarity (or dissimilarity) of each pixel from its neighboring pixels and selecting an image area bounded by a line drawn between the most dissimilar pixels. When selecting certain types of objects in images (e.g., a human face), such graph-cut methods often select an unnecessarily large image area containing unwanted image artifacts (e.g., background pixels, geometric artifacts, etcetera).

BRIEF DESCRIPTION OF THE DRAWINGS

The invention described herein illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in art, with the included descriptions, will be able to implement appropriate functionality without undue experimentation.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computing device may include one or more bus-based, or link-based, interconnects between components and/or one or more point-to-point interconnects between components. Embodiments of the invention may also be implemented as instructions carried by or stored on one or more machine-readable media, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins applets, widgets, code fragments, and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements (e.g., solid or dashed lines or arrows) are used to illustrate a connection, relationship, or association between or among two or more schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships, or associations between elements. For example, where a connecting element represents a communication signals, data, or instructions, it should be understood by those skilled in the art that such element may represent one or multiple signal paths (e.g., a bus), as may be needed, to effect the communication.

The present disclosure generally relates to systems and methods for selecting an object in a machine-readable image file based on the object's features of interest. By the term "image," the present disclosure refers both to still images and to videos (which, it will be appreciated, comprise a series of still images that may be processed in a similar manner) and contemplates both two-dimensional (2D) and three-dimensional (3D) images and videos. The presently disclosed systems and methods may be used in a computing device, such as the mobile computing device 100 illustrated in FIG. 1, by way of example. As described in more detail below (with reference to the simplified flow diagram illustrated in FIG. 2), the presently disclosed systems and methods involve detecting one or more features of an object in a machine-readable image file and simulating an electrostatic charge distribution by assigning a virtual point charge to each of the one or more detected features. A virtual electric potential field resulting from the simulated electrostatic charge distribution may then be determined (using a Poisson solver, by way of example). After determining the virtual electric potential field, a portion of the object in the machine-readable image file may be selected using an equipotential line in the virtual electric potential field. The presently disclosed systems and methods will be further described with reference to several illustrative embodiments of images containing a human face, as shown in FIGS. 3-6.

Figure 1:
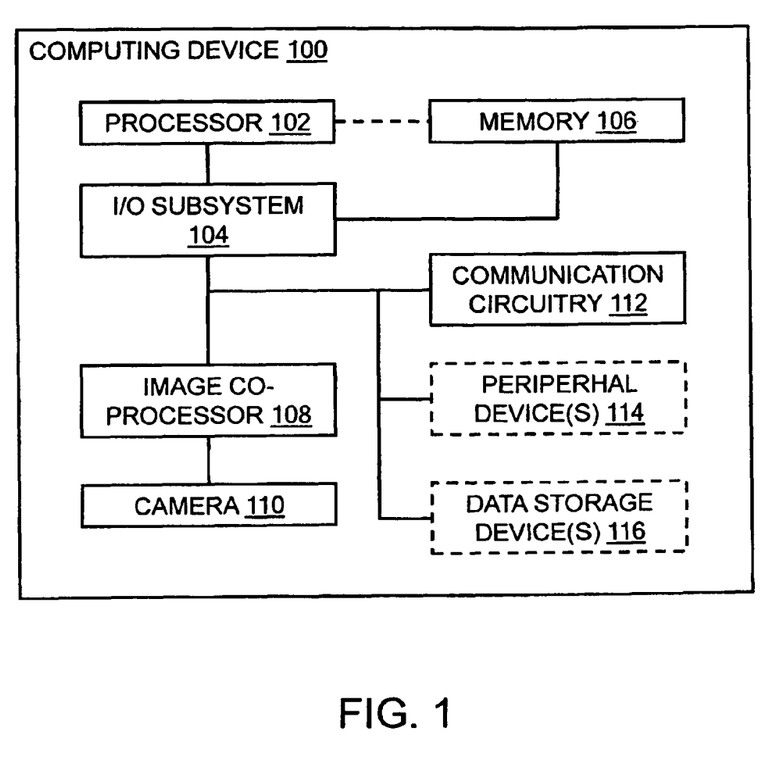
FIG. 1 is a simplified block diagram of at least one embodiment of a computing device including a camera and an image co-processor configured to select an object in an image captured by the camera.

Referring now to FIG. 1, one illustrative embodiment of a computing device 100 that may select an object in a machine-readable image file is shown as a simplified block diagram. The computing device 100 may be embodied as any type of electronic device capable of performing the functions described herein. By way of example, the computing device 100 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, the computing device 100 is embodied as a mobile computing device (e.g., a mobile internet device) including a processor 102, an I/O subsystem 104, a system memory 106, an image co-processor 108, a camera 110, and communication circuitry 112. The computing device 100 may also optionally include one or more peripheral devices 114 and one or more data storage devices 116. Furthermore, it should be appreciated that the computing device 100 may include other components, sub-components, and devices commonly found in a computer and/or computing device, which are not illustrated in FIG. 1 for clarity of the description.

The processor 102 of the computing device 100 may be any type of processor capable of executing software/firmware, such as a microprocessor, digital signal processor, microcontroller, or the like. It is contemplated that the processor 102 may be embodied as a single core processor or as a multi-core processor. The processor 102 functions as a primary processor (or central processing unit) of the computing device 100 and is generally responsible for executing a software stack, which may include an operating system and various applications, programs, libraries, and drivers resident on the computing device 100.

The processor 102 is communicatively coupled to the I/O subsystem 104 via a number of signal paths. These signal paths (and other signal paths illustrated in FIG. 1) may be embodied as any type of signal paths capable of facilitating communication between the components of the computing device 100. For example, the signal paths may be embodied as any number of wires, cables, light guides, printed circuit board traces, via, bus, intervening devices, and/or the like. The I/O subsystem 104 of the computing device 100 may be embodied as circuitry and/or components to facilitate input/output operations with the processor 102 and/or outer components of the computing device 100. In some embodiments, the I/O subsystem 104 may be embodied as a memory controller hub (MCH or "northbridge"), an input/output controller hub (ICH or "southbridge"), and a firmware device. In other embodiments, I/O subsystems having other configurations may be used. For example, in some embodiments, the I/O subsystem 104 may be embodied as a platform controller hub (PCH). In such embodiments, the memory controller hub (MCH) may be incorporated in or otherwise associated with the processor 102, and the processor 102 may communicate directly with the system memory 106 (as shown by the hashed line in FIG. 1). In still other embodiments, the I/O subsystem 104 may form a portion of a system-on-a-chip (SoC) and be incorporated, along with the processor 102 and other components of the computing device 100, on a single integrated circuit chip.

The system memory 106 of the computing device 100 is also communicatively coupled to the I/O subsystem 104 via a number of signal paths. The system memory 106 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 106 is illustrated in FIG. 1, in other embodiments, the computing device 100 may include additional system memory devices. In some embodiments, the system memory 106 may utilized as a shared memory that is accessible to additional processors of the computing device 100, such as the image co-processor 108.

The computing device 100 also includes an image co-processor 108 that serves to off-load image processing functions from the primary processor 102. The image co-processor 108 may be any type processor capable of executing software/firmware, such as a microprocessor, digital signal processor, microcontroller, or the like. The image co-processor 108 is communicatively coupled to a camera 110 of the computing device 100 via a number of signal paths and receives machine-readable image files (including still images and/or videos) captured by the camera 110. As illustrated in FIG. 1, the image co-processor 108 may also be communicatively coupled to the I/O subsystem 104 via a number of signal paths. In some embodiments, the image co-processor 108, the primary processor 102, and the I/O subsystem 104 may all be part of an SoC and be incorporated on a single integrated circuit chip.

The communication circuitry 112 of computing device 100 may be embodied as any number of devices and circuitry for enabling communications between the computing device 100 and one or more networks (not shown), including, but not limited to, local area networks, wide area networks, publicly available global networks (e.g., the Internet), and/or other networks. The communication circuitry 112 may include one or more wired and/or wireless network interfaces to facilitate communications over the wired and/or wireless portions of these networks. Communication circuitry 112 is also communicatively coupled to the I/O subsystem 104 via a number of signal paths.

The computing device 100 may also optionally include one or more peripheral devices 114 and one or more data storage devices 116. By way of illustrative example, the peripheral device(s) 114 may include a display, a touchpad, a touchscreen, a keyboard, a microphone, and/or one or more external speakers. The particular peripheral device(s) 114 included in the computing device 100 may depend upon, for example, the intended use of the computing device 100. The data storage device(s) 116 may be illustratively embodied as any type of device configured for the short-term or long-term storage of data such as, for example, memory devices and circuits, memory cards, solid-state drives, hard disk drives, or other data storage devices. When present, the peripheral device(s) 114 and the data storage device(s) 116 are each communicatively coupled to the I/O subsystem 104 via a number of signal paths, allowing the I/O subsystem 104 to receive inputs from and send outputs to the peripheral device(s) 114 and/or to the data storage device(s) 116.

Figure 2:
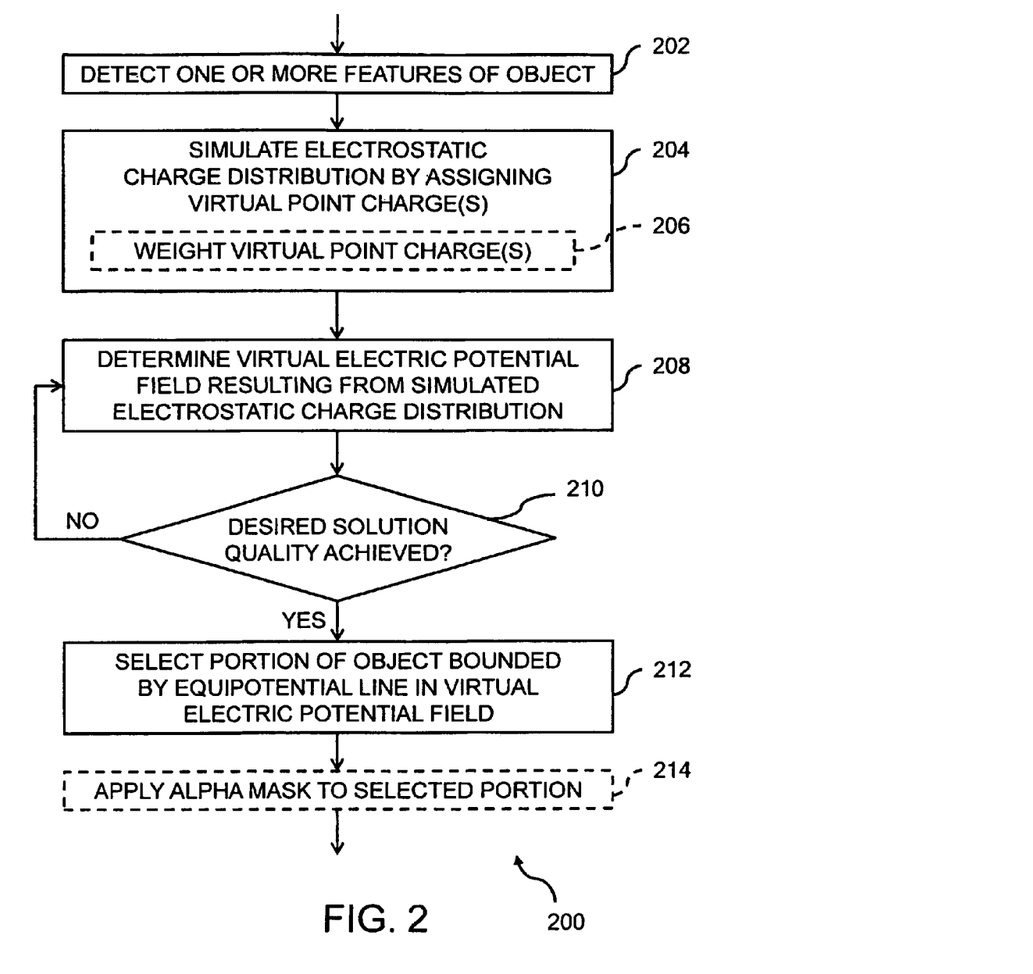
FIG. 2 is a simplified flow diagram of at least one embodiment of a method for selecting an object in a machine-readable image file.

Referring now to FIG. 2, an illustrative embodiment of a method 200 for selecting an object in a machine-readable image file is shown as a simplified flow diagram. The method 200 may be used to select any desired type of object from an image. For instance, the method 200 may be used to select a car, a house, an animal, or any other object that is present in an image. The method 200 is particularly well-suited for selecting a human face in an image, and the illustrative embodiment of method 200 will be described below using the selection of a human face as an example (with reference to FIGS. 3-6). In the illustrative embodiment, the method 200 may be executed by the image co-processor 108 to select an object in an image captured by the camera 110 (and/or in a machine-readable image file retrieved from the system memory 106). It is also contemplated that, in other embodiments, the method 200 may be performed by a multi-purpose processor, such as the processor 102, for instance. The method 200 is illustrated as a number of blocks 202-214 in FIG. 2. Blocks 206 and 214 may be optionally employed in some embodiments of the method 200 and are, therefore, indicated in phantom in FIG. 2.

Figure 3:
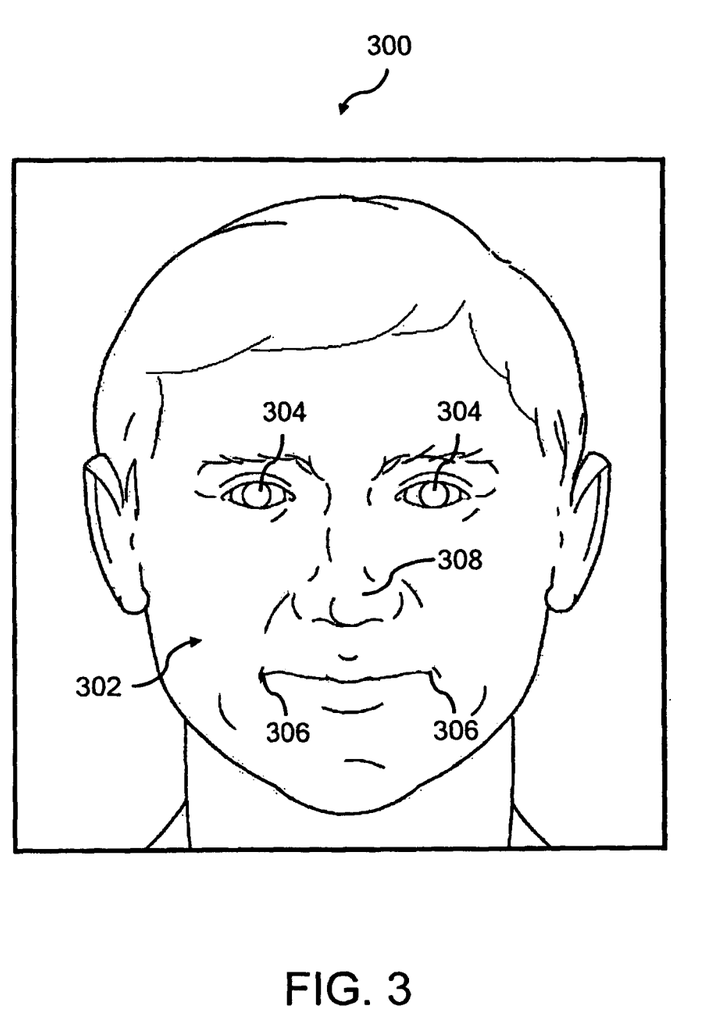
FIG. 3 illustrates at least one embodiment an image comprising a human face including a plurality of features.

The method 200 begins with block 202 in which the image co-processor 108 detects one or more features of an object machine-readable image file. The one or more features detected by the image co-processor 108 in block 202 may be any features of interest pertaining to the particular object to be selected. By way of example, where the object to be selected by the method 200 is a human face, the image co-processor 108 may detect one or more facial features. One illustrative embodiment of an image 300 including a human face 302 is shown in FIG. 3. In this illustrative embodiment, the human face 302 includes several features that may be detected by the image co-processor 108: the centers of the eyes 304, the corners of the mouth 306, the nose 308, and others. It is also contemplated that additional features of the human face 302 (e.g., the corners of the eyes, the lips, etcetera) may be detected by the image co-processor 108 and/or be used in the method 200.

During block 202, the image co-processor 108 may detect the one or more features of the object using any suitable method for recognizing objects in a machine-readable image file. In some embodiments, the image co-processor 108 may detect the one or more features of the object by applying a cascade of classifiers based on Haar-like feature to the machine-readable image file. For instance, the image co-processor 108 may apply the well-known Viola-Jones algorithm, or a variant thereof. Where the size of an image is relatively large compared to the object to be selected, the image co-processor 108 may iteratively use multiple classifiers to perform block 202. First, the image co-processor 108 may use an appropriate classifier over the entire image to detect the object. Second, the image co-processor 108 may use one or more appropriate classifiers over just the area of the object to detect the one or more features of interest. By way of example, the Viola-Jones algorithm may be applied to a relatively large image to detect the human face 302, resulting in the smaller image 300 shown in FIG. 3. Further classifiers may then be applied to the image 300 to detect the centers of the eyes 304, the corners of the mouth 306, and the nose 308.

Figure 4:
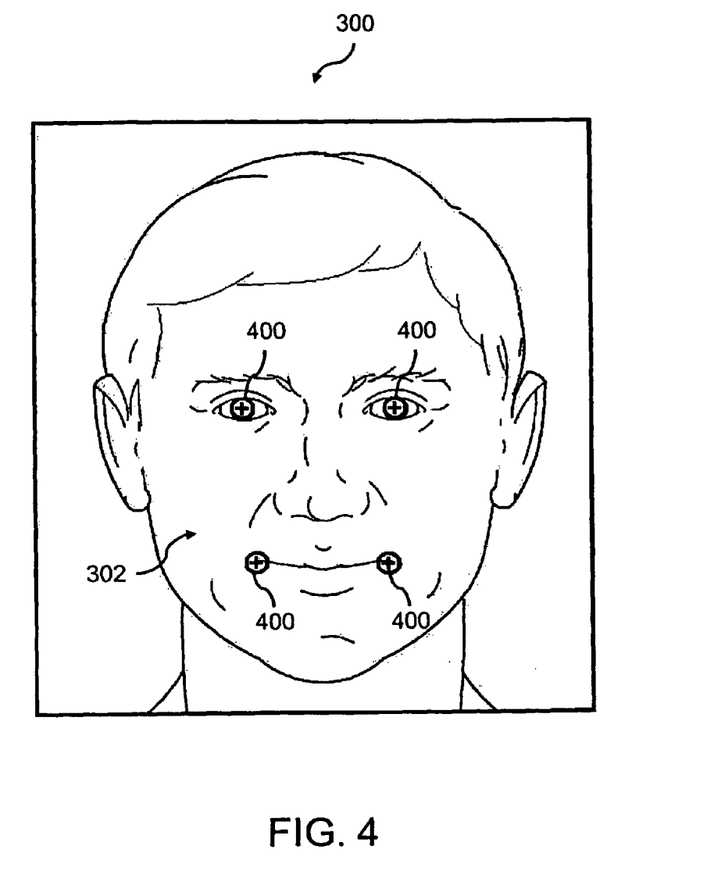
FIG. 4 illustrates at least one embodiment of the image of FIG. 3 further comprising a simulated electrostatic charge distribution including virtual point charges assigned to the plurality of features.

After block 202, the method 200 proceeds to block 204 in which the image co-processor 108 simulates electrostatic charge distribution by assigning a virtual point charge 400 to each of the one or more features of the object that were detected in block 202. In some embodiments, the image co-processor 108 may apply virtual point charges 400 to a plurality of features of the object, but need not apply a virtual point charge 400 to every detectable feature. As shown in FIG. 4, by way of example, the image co-processor 108 may apply virtual point charges 400 to the centers of the eyes 304 and the corners of the mouth 306 detected in block 202 (but not to the nose 308 or other features). The spacing of the virtual point charges 400 in the simulated electrostatic charge distribution is thus determined by the relative locations of the relevant features 304, 306 in the image 300. Although all of the virtual point charges 400 shown in FIG. 4 are illustrated as having a positive charge, it also contemplated that the simulated electrostatic charge distribution may additionally or alternatively comprise virtual point charges 400 with negative charges.

In some embodiments of the method 200, the block 204 may optionally include block 206 in which the image co-processor 108 weights the virtual point charge 400 assigned to each of the one or more detected features 304, 306 in response to the pixel colors near each virtual point charge 400. In other words, the image co-processor 108 may assign some virtual point charges 400 greater or lesser charge values than other virtual point charges 400 (e.g., +1 coulomb, +2 coulomb, +3 coulomb, etcetera). Virtual point charges 400 with greater charge values will have a larger impact on the resulting electric potential field, as compared to virtual point charges 400 with lesser charge values. In embodiments of the method 200 that do not include block 206, each of the virtual point charges 400 may have the same charge value (e.g., +1 coulomb).

Figure 5:
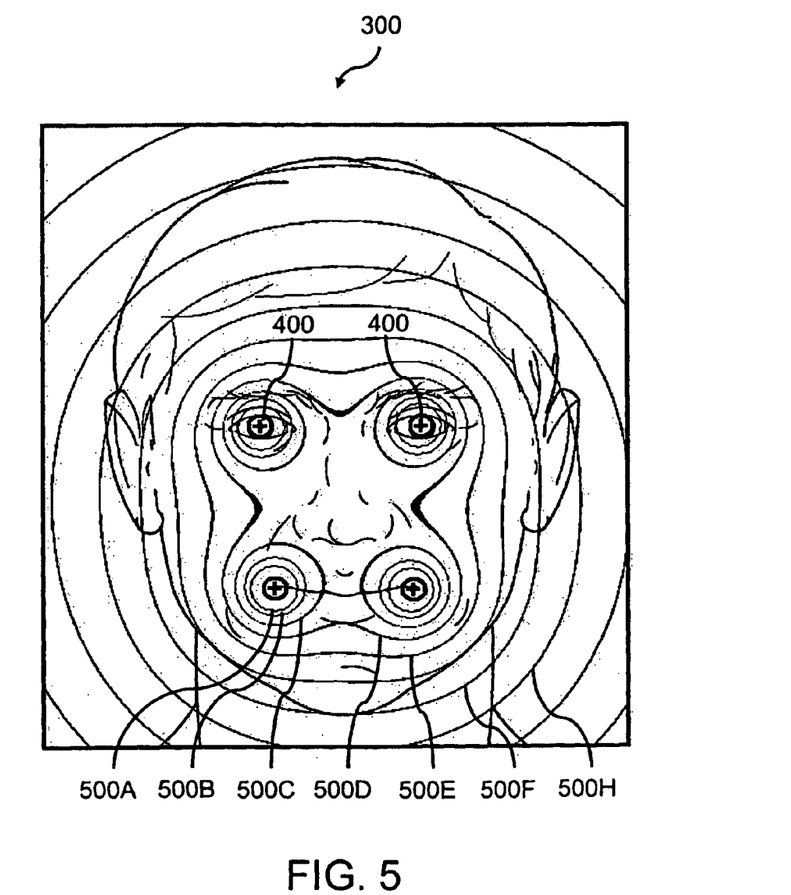
FIG. 5 illustrates at least one embodiment of the image of FIG. 3 further comprising a virtual electric potential field resulting from the simulated electrostatic charge distribution of FIG. 4.
Figure 6:
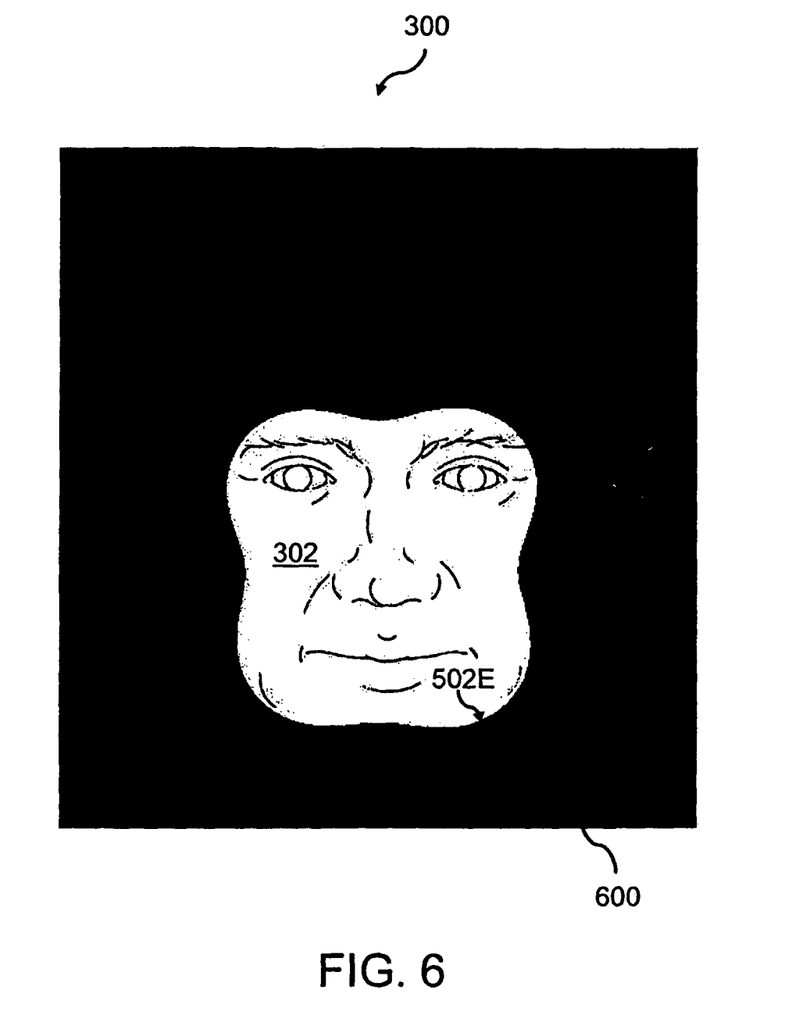
FIG. 6 illustrates at least one embodiment of a selected portion of the human face of FIG. 3 along with an alpha mask, the selected portion of the human face being bounded by an equipotential line of the virtual electric potential field of FIG. 5.

After block 204 (and, optionally, block 206), the method 200 proceeds to block 208 in which the image co-processor 108 determines a virtual electric potential field resulting from the simulated electrostatic charge distribution. The image co-processor 108 may use any suitable method for calculating the electric potential field created by a particular electrostatic charge distribution (i.e., the arrangement of virtual point charges 400 assigned in block 204). In some embodiments of block 208, the image co-processor 108 may calculate the virtual electric potential, or voltage, at each pixel within the image 300. As shown in FIG. 5, the virtual electric potential field may be represented by a number of equipotential lines 500A-H. Each equipotential line 500A-H represents all pixels in the image 300 that have a particular electric potential (i.e., an equal voltage to one another). It will be appreciated that the virtual electric potential field for the image 300 may contain greater or fewer equipotential lines than those shown in FIG. 5.

In the illustrative embodiment, the image co-processor 108 may determine the virtual electric potential field resulting from the simulated electrostatic charge distribution comprises in block 208 by applying a Poisson solver to calculate the virtual electric potential field. As will be appreciated by those of skill in the art, the electric potential field (φ) resulting from a particular electrostatic charge distribution (ρ) will satisfy Poisson's equation:

$$\nabla^2 \varphi = -\frac{\rho}{\varepsilon},$$

where ε is the permittivity of the medium and $\nabla^2$ is the Laplace operator. Numerous Poisson solvers have been developed for numerically solving this elliptic partial differential equation, any of which may be used by the image co-processor 108 in block 208. For instance, the image co-processor 108 may apply a Poisson solver that uses a fast Fourier transform (FFT) to calculate a solution to the discrete Poisson equation. In other embodiments, the image co-processor 108 may apply an iterative Poisson solver (e.g., using a successive over-relaxation (SOR) algorithm).

After block 208, the method 200 proceeds to block 210 in which the image co-processor 108 determines whether the determination of the virtual electric potential field in block 208 achieved a desired solution quality. In the illustrative embodiment described above, the Poisson solver applied in block 208 may be capable of calculating the virtual electric potential field resulting from the simulated electrostatic charge distribution with varying levels of granularity (with increasing solution quality coming at the expense of increased computation time). By way of example, in embodiments employing an iterative Poisson solver, the solution quality may increase with each successive iteration. Thus, in block 210, the image co-processor 108 examines the virtual electric potential field calculated in block 208 to determine whether adequate equipotential lines can be found in the image 300. If the image co-processor 108 determines that the desired solution quality for the virtual electric potential field has not been achieved, the method 200 returns to block 208, as shown in FIG. 2.

If the image co-processor 108 instead determines in block 210 that the desired solution quality for the virtual electric potential field has been achieved, the method 200 then proceeds to block 212 in which the image co-processor 108 selects a portion of the object in the machine-readable image file that is bounded by one equipotential lines 500A-H in the virtual electric potential field. In some embodiments, the image co-processor 108 may automatically choose one of the equipotential lines 500A-H as the boundary for the selected portion of the object. For instance, the image co-processor 108 may automatically choose the equipotential line 500D having the smallest internal area while encompassing all virtual point charges 400. As another example, the image co-processor 108 may automatically choose the equipotential line 500F having the largest internal area while not encompassing any background pixels. In other embodiments, the image co-processor 108 may allow a user to choose which one of the equipotential lines 500A-H will serve as the boundary for the selected portion of the object. In the illustrative embodiment of FIG. 6, the equipotential line 500E has been chosen as the boundary for the selected portion of the human face 302.

After block 212, the method 200 may optionally proceed to block 214 in which the image co-processor 108 applies an alpha mask 600 to the selected portion of the object. The image co-processor 108 may apply the alpha mask 600 to allow the selected portion of the object to be seamlessly copied-and-pasted to another machine-readable image file (or to another location in the same machine-readable image file). The alpha mask 600 serves to make the area surrounding the selected portion of the object transparent. In the illustrative embodiment of FIG. 6, the alpha mask 600 (represented by the dark area) surrounds the selected portion of the human face 302 (i.e., the alpha mask 600 occupies the area outside the equipotential line 500E). Thus, using the method 200, the image co-processor 108 may allow a user of the mobile computing device 100 to perform on-the-fly editing of images captured by the camera 110.

While the disclosure has been illustrated and described in detail in the drawings and foregoing description, such an illustration and description is to be considered as exemplary and not restrictive in character, it being understood that only illustrative embodiments have shown and described and that all changes and modifications consistent with the disclosure and recited claims are desired to be protected.

The invention claimed is:

1. A computing device comprising:
   a camera; and
   an image co-processor to (i) detect one or more features of an object in an image captured by the camera, (ii) assign a virtual point charge to each of the one or more detected features to simulate an electrostatic charge distribution, (iii) determine a virtual electric potential field that results from the simulated electrostatic charge distribution, and (iv) select a portion of the object in the captured image that is bounded by an equipotential line in the virtual electric potential field.

2. The computing device of claim 1, wherein to detect the one or more features of the object comprises to apply a cascade of classifiers based on Haar-like features to the captured image.

3. The computing device of claim 1, wherein to assign the virtual point charge to each of the one or more detected features comprises to weight the virtual point charge assigned to each of the one or more detected features in response to pixel colors near the virtual point charge.

4. The computing device of claim 1, wherein the image co-processor is further to apply an alpha mask to the selected portion of the object in the captured image that is bounded by the equipotential line in the virtual electric potential field.

5. The computing device of claims 1, wherein to determine the virtual electric potential field that results from the simulated electrostatic charge distribution comprises to apply a Poisson solver to determine the virtual electric potential field.

6. The computing device of claim 1, wherein to determine the virtual electric potential field that results from the simulated electrostatic charge distribution comprises to apply an iterative Poisson solver to calculate the virtual electric potential field until a desired solution precision for the virtual electric potential field is achieved.

7. The computing device of claim 1, wherein to detect the one or more features of the object comprises to detect a plurality of features of a human face.

8. The computing device of claim 7, wherein to detect a plurality of features of a human face comprises to detect at least one eye feature and at least one mouth feature.

9. The computing device of claim 1, wherein to detect the one or more features of the object comprises to detect a plurality of the features of the object;
and wherein the one or more detected features are a subset of the plurality of the features.

10. A method comprising:
detecting, by a computing device, one or more features of an object in a machine-readable image file;
simulating, by the computing device, an electrostatic charge distribution by assigning a virtual point charge to each of the one or more detected features;
determining, by the computing device, a virtual electric potential field resulting from the simulated electrostatic charge distribution; and
selecting, by the computing device, a portion of the object in the machine-readable image file that is bounded by an equipotential line in the virtual electric potential field.

11. The method of claim 10, wherein detecting the one or more features of the object comprises applying a cascade of classifiers based on Haar-like features to the machine-readable image file.

12. The method of claim 10, wherein simulating the electrostatic charge distribution comprises weighting the virtual point charge assigned to each of the one or more detected features in response to pixel colors near the virtual point charge.

13. The method of claim 10, wherein determining the virtual electric potential field resulting from the simulated electrostatic charge distribution comprises applying a Poisson solver to determine the virtual electric potential field.

14. The method of claim 10, wherein determining the virtual electric potential field resulting from the simulated electrostatic charge distribution comprises applying an iterative Poisson solver to calculate the virtual electric potential field until a desired solution precision for the virtual electric potential field is achieved.

15. The method of claim 10, wherein detecting the one or more features of the object comprises detecting a plurality of features of a human face.

16. The method of claim 15, wherein detecting a plurality of features of a human face comprises detecting at least one eye feature and at least one mouth feature.

17. One or more non-transitory machine-readable media comprising a plurality of instructions that, in response to being executed, cause a processor of a computing device to:
detect one or more features of an object in a machine-readable image file;
assign a virtual point charge to each of the one or more detected features to simulate an electrostatic charge distribution;
determine a virtual electric potential field that results from the simulated electrostatic charge distribution; and
select a portion of the object in the machine-readable image file that is bounded by an equipotential line in the virtual electric potential field.

18. The one or more non-transitory machine-readable media of claim 17, wherein to detect the one or more features of the object comprises to apply a cascade of classifiers based on Haar-like features to the machine-readable image file.

19. The one or more non-transitory machine-readable media of claim 18, wherein to simulate the electrostatic charge distribution comprises to weight the virtual point charge assigned to each of the one or more detected features in response to pixel colors near the virtual point charge.

20. The one or more non-transitory machine-readable media of claim 17, wherein the plurality of instructions further cause the processor to apply an alpha mask to the selected portion of the object in the captured image that is bounded by the equipotential line in the virtual electric potential field.

21. The one or more non-transitory machine-readable media of claim 17, wherein to determine the virtual electric potential field that results from the simulated electrostatic charge distribution comprises to apply a Poisson solver to determine the virtual electric potential field.

22. The one or more non-transitory machine-readable media of claim 17, wherein to determine the virtual electric potential field that results from the simulated electrostatic charge distribution comprises to apply an iterative Poisson solver to calculate the virtual electric potential field until a desired solution precision for the virtual electric potential field is achieved.

23. The one or more non-transitory machine-readable media of claim 17, wherein to detect the one or more features of the object comprises to detect a plurality of features of a human face.

24. The one or more non-transitory machine-readable media of claim 23, wherein to detect a plurality of features of a human face comprises to detect at least one eye feature and at least one mouth feature.

* * * * *